US008789100B2

(12) United States Patent
Contin et al.

(10) Patent No.: US 8,789,100 B2
(45) Date of Patent: Jul. 22, 2014

(54) METHOD AND TV RECEIVER FOR STORING CONTENTS ASSOCIATED TO TV PROGRAMS

(75) Inventors: Laura Contin, Turin (IT); Maurizio Pelizza, Turin (IT); Luigi Quattrocchi, Turin (IT); Piero Mozzone, Turin (IT)

(73) Assignee: Telecom Italia S.p.A., Milan (IT)

( * ) Notice: Subject to any disclaimer, the term of this patent is extended or adjusted under 35 U.S.C. 154(b) by 1040 days.

(21) Appl. No.: 12/227,827

(22) PCT Filed: May 31, 2006

(86) PCT No.: PCT/EP2006/005206
§ 371 (c)(1),
(2), (4) Date: Feb. 19, 2009

(87) PCT Pub. No.: WO2007/137611
PCT Pub. Date: Dec. 6, 2007

(65) Prior Publication Data
US 2009/0271815 A1    Oct. 29, 2009

(51) Int. Cl.
| H04N 5/445 | (2011.01) |
| H04N 7/16 | (2011.01) |
| H04N 21/436 | (2011.01) |
| H04N 21/858 | (2011.01) |
| H04N 21/61 | (2011.01) |
| H04N 21/63 | (2011.01) |
| H04N 21/475 | (2011.01) |
| H04N 21/258 | (2011.01) |
| G06Q 30/06 | (2012.01) |
| H04N 7/173 | (2011.01) |
| H04N 21/4147 | (2011.01) |
| H04N 21/433 | (2011.01) |
| H04N 21/81 | (2011.01) |
| H04N 21/45 | (2011.01) |

(52) U.S. Cl.
CPC ..... *H04N 7/17309* (2013.01); *H04N 21/43615* (2013.01); *H04N 21/858* (2013.01); *H04N 21/6125* (2013.01); *H04N 21/631* (2013.01); *H04N 21/4758* (2013.01); *H04N 21/25891* (2013.01); *G06Q 30/06* (2013.01); *H04N 21/4532* (2013.01); *H04N 21/4147* (2013.01); *H04N 21/4334* (2013.01); *H04N 21/812* (2013.01)
USPC ............................................. 725/40; 725/142

(58) Field of Classification Search
USPC ............................................. 725/40, 43, 142
See application file for complete search history.

(56) References Cited

U.S. PATENT DOCUMENTS

| 5,907,350 A | 5/1999 | Nemirofsky |
| 6,215,483 B1 | 4/2001 | Zigmond |

(Continued)

FOREIGN PATENT DOCUMENTS

| DE | 101 39 669 B4 | 1/2007 |
| EP | 1 304 876 A2 | 4/2003 |
| WO | WO 02/085024 A1 | 10/2002 |

*Primary Examiner* — Nasser Goodarzi
*Assistant Examiner* — Hyun Hong
(74) *Attorney, Agent, or Firm* — Finnegan, Henderson, Farabow, Garrett & Dunner, L.L.P.

(57) ABSTRACT

In order to offer contents on demand services triggered by broadcasted TV programs in an efficient and effective way, notifications are received by a TV receiver, for example, a set-top box, on the availability of additional contents, such as, movie tracks, back stages, audio and/or video interviews, written articles, songs, photos, games, software programs, catalogues, brochures, electronic books, electronic tickets, electronic discounts, and electronic bonuses, together with TV programs, and these additional contents are automatically collected and stored into electronic appliances, for example, a portable electronic appliance, at the request of a user.

23 Claims, 2 Drawing Sheets

(56) References Cited

U.S. PATENT DOCUMENTS

| | | |
|---|---|---|
| 6,789,106 B2 | 9/2004 | Eyer et al. |
| 6,807,675 B1 * | 10/2004 | Maillard et al. ............... 725/35 |
| 2002/0087988 A1 | 7/2002 | Lipscomb et al. |
| 2002/0194264 A1 | 12/2002 | Uchiyama et al. |
| 2003/0061607 A1 | 3/2003 | Hunter et al. |
| 2003/0079224 A1 | 4/2003 | Komar et al. |
| 2004/0073950 A1 * | 4/2004 | Tan et al. .................... 725/135 |
| 2004/0172662 A1 | 9/2004 | Danker et al. |
| 2005/0086690 A1 | 4/2005 | Gilfix et al. |
| 2005/0193425 A1 | 9/2005 | Sull et al. |
| 2005/0198677 A1 * | 9/2005 | Lewis ........................ 725/87 |
| 2007/0079347 A1 * | 4/2007 | Makise ....................... 725/115 |
| 2007/0124781 A1 * | 5/2007 | Casey et al. ................. 725/94 |
| 2008/0016533 A1 * | 1/2008 | Rothschild .................. 725/60 |
| 2010/0077428 A1 * | 3/2010 | Arnold et al. ................ 725/34 |
| 2010/0125884 A1 * | 5/2010 | Howcroft .................... 725/93 |

* cited by examiner

METHOD AND TV RECEIVER FOR STORING CONTENTS ASSOCIATED TO TV PROGRAMS

CROSS REFERENCE TO RELATED APPLICATION

This application is a national phase application based on PCT/EP2006/005206, filed May 31, 2006.

The present invention relates primarily to a method for storing contents associated to TV programs and additionally to a TV receiver adapted to carry out this method.

FIELD OF THE INVENTION

In the past, some TV broadcasters provided teletext information in addition to broadcast video using the same signal; the teletext service is provided still nowadays.

With the advent of digital TV transmission technology, TV broadcasters are now able to provide much more than broadcast video and teletext. Transmission of digital signals may occur in different ways. In digital terrestrial television (DTT) systems, the broadcast signal is transmitted "over the air" to an antenna. Other widespread systems include cable TV systems and satellite TV systems. Finally, IP systems are viable means to bring television into a household and provide users a means to receive video, audio and data content.

Today, many viewers receive digital television via a set-top box (STB), which decodes digital signals and displays them on a TV monitor usually of a TV set. Advanced STBs can also be programmed to execute applications that can interact with the user through the use of the remote control device of the STB and with service centers using a modem and a communications network, typically the public switched telephone network [PSTN]. The STB comprises a computer that runs a program which decodes the TV signal and executes the software that is transmitted either through a broadcast channel (together with the audio or video streams) or through a return channel. Return channel is the physical path used by the STB to let the client interact with a server. For example, through the return channel, interactive TV users can transmit information (e.g. votes, questionnaires, . . . ) to a service center or request the transmission of information (e.g. timetable of trains, stock exchange quotes, . . . ) from a service center. The physical path can be a wired connection, such as a telephone line or an xDSL line, or a wireless connection, e.g. GPRS or UMTS.

Concerning the type of services provided to the user, we can distinguish between two different paradigms to access the contents: the Broadcasting and the Content on Demand, in short form CoD.

Broadcasting is typical for broadcasting TV networks (i.e. terrestrial, cable or satellite), even if it can be used also on IP networks, sometimes called with different names depending on the distribution network (e.g. "webcasting" on Internet). According to this paradigm, the service provider can decide what contents to distribute and their schedule independently from any direct user request. The user can only tune its STB on a suitable "channel" to access the contents. The schedule of each channel can be made available in many ways, e.g. on magazines or on so-called Electronic Program Guide (EPG) or Broadband Content Guide (BCG).

CoD is typical for IP networks. The user selects a piece of contents among those offered by the service provider and requests either its streaming or (if the STB is equipped with a Hard Disk) its download at a specific time. Broadcasting is a push service (that is a service where the service provider, in this case the broadcaster, sends information out regardless of whether anyone has requested it or even is tuned in), while CoD is a pull service (that is a service where the service provider sends information out only when someone has requested it).

BACKGROUND OF THE INVENTION

From U.S. Pat. No. 6,789,106, it is known a method and a structure that allows a user who has access to an audio/visual object to cause an interactive control element of an interactive multimedia system to grab and store for future retrieval and peruse the audio/visual object by simply activating a selection mechanism of the interactive multimedia system. The interactive control element of the interactive multimedia system receives a plurality of audio/visual objects for play from the content provider and causes each such object to be stored to a temporary storage element as it is played. In response to the user activating the selection mechanism of the interactive multimedia system, it is determined whether the interactive control element has completed storing an audio/visual object to the temporary storage element that the user has selected via the selection mechanism. If the interactive control element has completed storing the selected audio/visual object to the temporary storage element, the selected audio/visual object is transferred from the temporary storage element to a long-term storage element. If, however, the interactive control element has not completed storing the selected audio/visual object to the temporary storage element, it is determined whether the selected audio/visual object is currently being played. If it is not currently being played, this means that the selected object may not be available locally and the interactive control element retrieves the selected audio/visual object from the content provider (if necessary) and stores it in the long-term storage element. If the selected audio/visual object is being currently played, then the interactive control element continues to store the selected audio/visual object within the temporary storage element until the selected audio/visual object is stored in its entirety (has finished playing) and then transfers it from the temporary storage element to the long-term storage element, where it can be retrieved at some later time when desired.

From patent application n° US2002/0087988, it is known an interactive TV contextual content surfing method, system and program product that enables viewers to surf from one related program to another program through hyperlinking. A TV broadcast station receives interactive TV program content generated by creators. The content is categorized by the creator and provided to the broadcast station in the MPEG or webstreaming video/audio formats. A broadcast server stores a dynamic table of correspondence between TV program categories and TV channel numbers. The hyperlinking information contains a list of channels that broadcast the same nature of programs by referencing the correspondence table. The server broadcasts the hyperlinking information to the list of channels. The broadcast network carries the TV programs and associated classification information in separate channels to the local TV station for retransmission to TV devices including set-top boxes. The set-top box stores program information by categories in classification tables, contents of a TV program guide section, and recorded programs.

From U.S. Pat. No. 6,215,483, it is known a method and apparatus for receiving logical address links in advance of a television program and combining such links with those links that may be received in real-time during a television broadcast. According to one aspect of this invention, content associated with a TV program may be automatically displayed by a client system, such as an Internet terminal or a computer equipped with a TV tuner. Prior to broadcast of a TV program, TV listing information is stored in the client system. The TV listing information includes one or more batch mode logical addresses, e.g. Uniform Resource Locators (URLs), that identify content, such as Internet content. The client system alerts the viewer of the existence of an active logical address associated with the current TV program by providing a visual indication. After the visual indication has been selected by the viewer, the client system displays the content identified by the logical address. Additionally, one or more real-time logical addresses may be received by the client system embedded in a video signal associated with the TV program. The real-time logical addresses may be embedded in either a text service channel (e.g., T1, T2, T3, T4) or a captioning service channel (e.g., CC1, CC2, CC3, CC4) of the vertical blanking interval (VBI) of the video signal. When both real-time logical addresses and batch mode logical addresses are associated with a TV program, the client system determines which to bring to the attention of the user of the client system based upon a set of predefined rules. Features of the present invention are applicable to many broadcast television (TV) systems including National Television Standards Committee (NTSC), Phase Alternate Lines (PAL), and Sequential Couleur Avec Memoire (SECAM) as well as the proposed High Definition Television (HDTV) standard.

From patent application n° WO02/085024, it is known a video-processing method and system for enriching one or several primary video signals by association of additional data in a video scene encoded in accordance with the MPEG4 standard, this associating allowing simultaneous display of a primary video signal and said additional data, and enabling a user to interact with and access the contents of said additional data.

From patent application n° US2005/0193425, it is known a method for delivery and presentation of information relevant to the contents of frames in an audio/video program that enables TV viewers to retrieve information on the contents (for example, objects, items, concepts and the like) contained in a frame or a set of frames (video segments) when they watch TV or video programs. The information relevant to the contents of frame(s) is delivered to a STB or DVR by third-party service providers through back channels such as the Internet if the information of how to accurately access the frames pointed by STB users are delivered to the service providers, and the content-relevant information may be presented in the form of a GUI for the TV viewer. This disclosure relates to the processing of program guide information and, more particularly, to techniques for delivering information on video segments of broadcast TV programs to STBs.

SUMMARY OF THE INVENTION

The Applicant has noted that, due to their structure, present commercial STBs are not adapted to delivery of CoD services requested by a user in an efficient, effective and flexible way, easy to be used by ordinary people while watching TV and using electronic appliances, particularly portable ones.

The Applicant has found that it can be possible to overcome the above cited problems by receiving notifications on the availability of additional contents (such as movie tracks, back stages, audio and/or video interviews, written articles, songs, photos, games, software programs, catalogues, brochures, electronic books, electronic tickets, electronic discounts, electronic bonuses, . . . ) together with TV programs, and by automatically collecting and storing these additional contents on electronic appliances, for example a portable electronic appliance, at the request of a user.

This can be achieved through appropriately designed TV receivers, such as a set-top boxes, and appropriately assembled TV signals.

The additional contents are downloaded directly or indirectly (but without user intervention) into the electronic appliance for future use by the user.

Particularly, the present invention provides for an STB with a return channel (e.g. PSTN, xDSL, GPRS, etc.), a home network and a mass storage device, such as an external HDD, an USB storage or an MP3 player. The STB and the mass storage device are connected to the home network and communicate through it and the home network is connected to an external IP network through an access gateway (this connection is used to implement the return channel of the STB). Additionally, the STB could be univocally identifiable, for example by data stored on a smart card, permanent storage, serial number, etc. The synchronization between a TV program and the starting of an interactive application can be achieved by means of different techniques: for example the streaming events can be used in the case of MHP [Multimedia Home Platform], the standard middleware specified by DVB [Digital Video Broadcasting] for interactive TV.

According to a typical embodiment of the present invention, a user, while he is watching a TV program, is notified on the screen of his TV set that some additional contents associated to this TV program are available through e.g. a red button appearing in a corner of the screen; then the user may check what the available contents are and select the one (or the ones), for example an MP3 file, he is interested to download on his portable electronic appliance, for example an MP3 player, through e.g. a menu appearing on the screen. Automatically, the selected contents are downloaded into the electronic appliance and the user can enjoy e.g. the music at any later time and place he likes.

BRIEF DESCRIPTION OF THE DRAWINGS

The present invention will become more clear from the following description to be considered in conjunction with the annexed drawing in which.

DETAILED DESCRIPTION OF THE INVENTION

Figure 1:
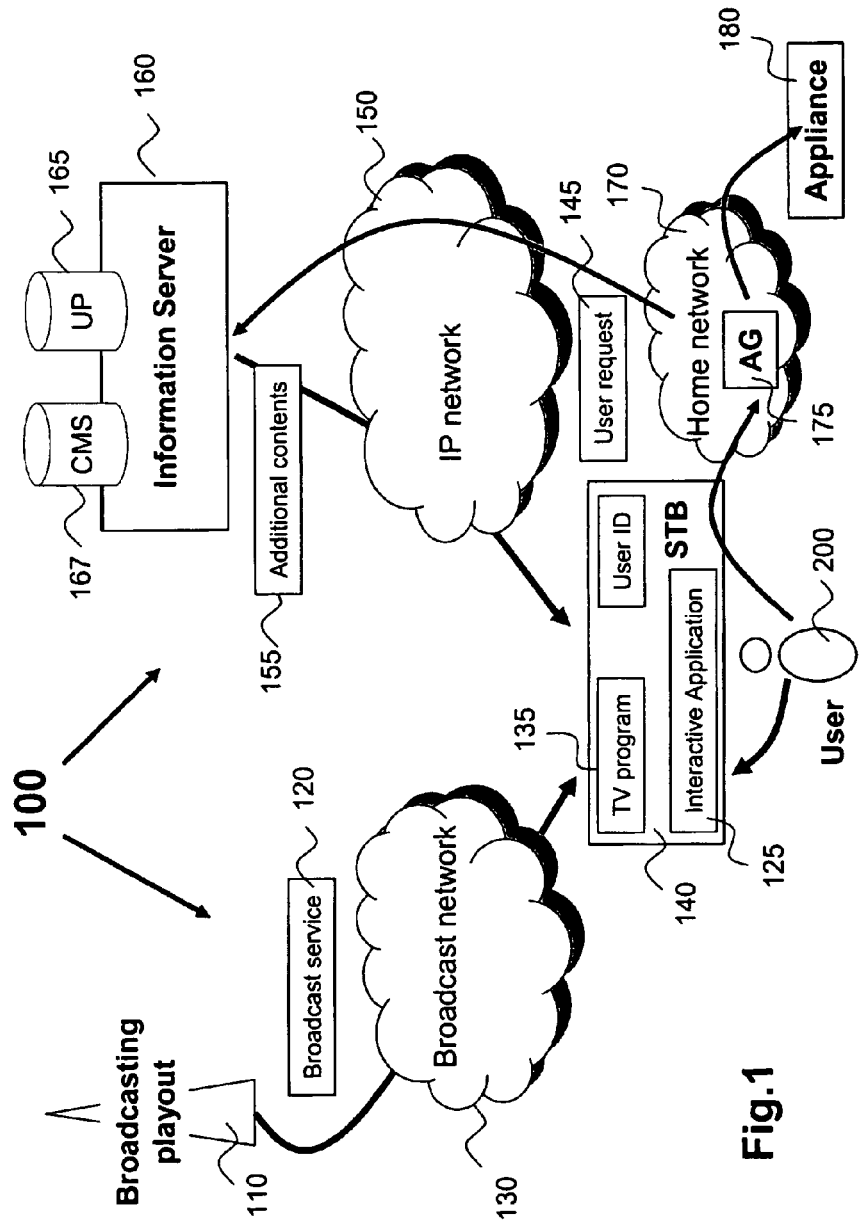
FIG. 1 shows a system that is able to implement some embodiments of the present invention.

In FIG. 1, the overall system is indicated with reference 100 and comprises:
 a broadcasting playout 110,
 an information server 160,
 a set-top box (STB) 140,
 an access gateway (AG) 175,
 an electronic appliance 180;

Set-top box 140 is connected to broadcasting playout 110 through a broadcast TV network 130; set-top box 140 is connected to information server 160 through the access gateway 175 and an IP network 150; set-top box 140 is connected to electronic appliances 180 through the access gateway 175 and a home network 170; set-top box 140 is also connected to a traditional television set that is not shown in the figure. The connection between set-top box 140 and access gateway 175 is advantageously an Ethernet connection. Additionally, in FIG. 1, a user 200 is shown that uses the set-top box, the television set and the electronic appliance. In general, system 100 comprises a plurality of STBs as there is usually at least one STB for each household. Within some of the households there will be a home network to which a plurality of electronic appliances are connected.

Broadcasting playout 110 distributes broadcast services 120, including TV programs 135 and associated interactive applications 125; broadcasting playout 110 is connected to the users' STBs through the broadcast TV network, such as DTT [Digital Terrestrial Television] satellite television or cable television.

Preferably, the format of the broadcast services is the MPEG-2 TS [Moving Picture Expert Group Transport Stream]; a clear and quite brief description of this standard can be found e.g. in patent application n° US2005/0193425 which is incorporated herein by reference.

The kind of modulation depends on the kind of TV network, as specified by the DVB [Digital Video Broadcasting] consortium. In a single MPEG-2 TS many components are multiplexed together, for example: TV program, interactive applications and additional information, such as the AIT [Application Information Table]. The multiplexing can be done by the broadcaster at the playout or by a content provider.

Information server 160 stores, manages and distributes additional contents 155 (such as related audio track) usually by using a content management system (CMS) 167. Additionally, it could manage a user profiling system (UP) 165 and the interaction with the end-user STBs. Typically it communicates to STB 140 (and to the other STBs of system 100) through an IP network being fixed (e.g. based on ADSL) and/or mobile (e.g. based on GPRS). Preferably, the protocol used for the communication between information server 160 and STB 140 is HTTP [Hyper Text Transfer Protocol], but other protocols could be used such as e.g. FTP [File Transfer Protocol] for downloading and RTP [Real-time Transport Protocol] for streaming.

STB 140 can receive broadcast services, decode them, play the TV programs and run the interactive applications.

The interactive applications can be embedded in the broadcast services, but they can also be natively available on the STB or sent to it through the IP network. Among the functionalities that can be supported by the interactive applications, we can mention: the presentation of information sent through the broadcast network (e.g. a notification of additional contents available on demand); the management of the graphical user interface (e.g. conversion of a key selection into a specific action, such as to send a request to an information server, specifically information server 160); the management of the return channel, in order to enable the bidirectional communication between the user and an information server, specifically information server 160; the management of the communication with a smart card that could be located within an STB, specifically STB 140, or connected to a home network, specifically home network 170, and that would be used to store sensitive information, such as identification data and decryption keys, in order to read and update data recorded on the smart card. Additionally, the interactive applications could also manage the transfer of additional contents 155 toward electronic-appliance 180 through home network 170. The protocol used for the communication between STB 140 and electronic appliance 180 could be HTTP, but also proprietary protocols could be used. In this case, typically a conversion of protocols should be performed either by STB 140 or by access gateway 175.

Access gateway 175 provides two basic functionalities: it is the bridge between home network 170 and the IP network 150 and it is the router among the devices connected to home network 170, including set-top box 140 and electronic appliances 180 but not excluding e.g. one or more PCs. Access gateway 175 could be advantageously provided with intelligent features, such as discovery of devices on the network, protocol conversion, association between file format and device, etc.

Electronic appliance 180 could be for example a media player or an MP3 portable player (others of the many possible examples will be provided in the following) where the additional contents received by STB 140 from information server 160 will be stored.

In the following, the overall working of an embodiment of the method according to the present invention is described. In order to represent the core components of the invention, a simple case is illustrated, where no other systems are considered, such as e-payment system, DRM [Digital Rights Management] system, user profiling system, parental control system, etc.; in practice, these other systems are likely to be involved and used.

Figure 2:
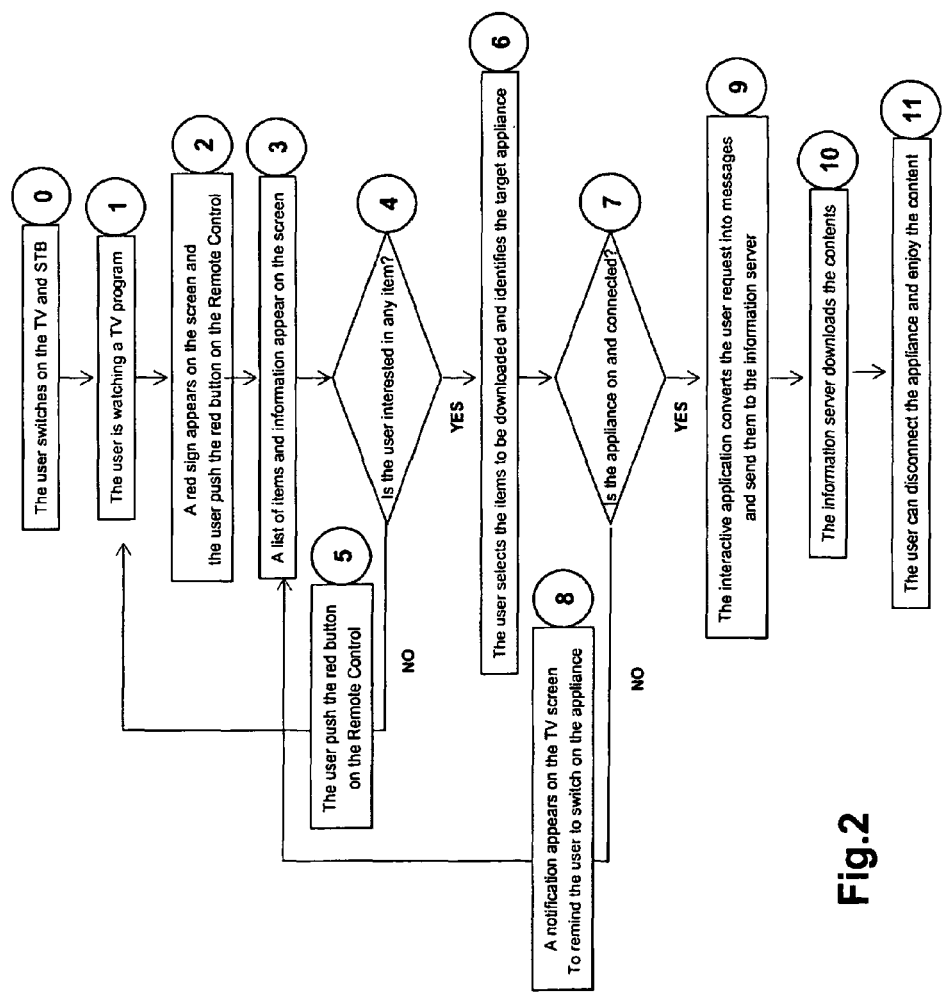
FIG. 2 shows a flowchart of an embodiment of the method according to the present invention.

The flowchart of the main actions are depicted in FIG. 2.

Action 0: User 200 switch on the TV set and STB 140.

Action 1: The TV set is tuned on a specific channel and user 200 is watching a TV program. The interactive application that controls the CoD [Content on Demand] service according to the present invention is downloaded to STB 140, but it keeps the "sleeping" status until it receives a specific event. Many different techniques can be used for managing the life cycle of the application, in case the MHP [Multimedia Home Platform] stack is implemented on STB 140, the application can be controlled by means of stream events. DSM-CC [Digital Storage Media Command and Control] stream events are markers that are embedded in a transport stream via MPEG-2 private sections, with each marker consisting of an identifier and a time reference. The identifier allows each stream event to be uniquely identified, while the time reference indicates at what point in the stream the event should trigger the change of the interactive application status, from "sleeping" into "running".

Action 2: User 200 sees e.g. a red sign in a corner of the screen of the TV set and pushes the red button of the remote control device of STB 140. The red sign is produced by the interactive application that now is in the 'running' status.

Action 3: The interactive application shows a GUI [Graphic User Interface], that presents on the screen of the TV set a list of additional contents available on demand, preferably together with additional information, such as dimension of the file, time needed for downloading, etc.

Action 4: User 200 checks the offer and decides whether to request the download of any content.

Action 5: If User 200 is not interested in downloading any content, he pushes again the red button of the remote control device of STB 140 and come back watching the TV program.

Action 6: If User 200 is interested in downloading any content, he selects from the GUI the items he is interested in and sends a request 145 to an information server, specifically information server 160, indicating what is the target electronic appliance (in the case of FIG. 1, there is only one electronic appliance shown, namely appliance 180, but many others can be provided).

Action 7: The interactive application checks whether the indicated appliance is on and connected.

Action 8: If the indicated appliance is not ready, a notification appears on the screen of the TV set, inviting the user to check the status of his home network, specifically network 170, and of the indicated appliance, specifically appliance 180.

Action 9: If the indicated appliance is on and connected, the interactive application converts the commands received from user 200 into a message and send it to information server 160.

This message includes the IP address associated to STB 140 and the content items requested by user 200, but it could also include additional information such as ID of STB 140, TV channel on which STB 140 is currently tuned on, etc.

Action 10: Information Server 160 downloads the contents, that are routed by access gateway 175 to electronic appliance 180. When download is finished, a notification appears on the screen of the TV set.

Action 11: User 200 can disconnect appliance 180 from home network 170 and bring it with him for enjoying the downloaded content items at a convenient occasion.

The above described specific embodiment is subject to many variations and extensions; some of these will be considered in detail in the following.

A first extension is related to the network to be used for delivering the CoD service. In fact, if the same content items are of interest to a certain number of users or if return channel becomes not available or has a limited bandwidth, the additional content items can be sent through a broadcast channel, in particular the broadcast TV channel. This can be achieved for example by a mechanism similar to that used in the PPV [Pay-Per-View] services, using a suitable identification system, to identify the user and/or the STB, where television viewers can purchase events to be seen on a TV set and pay for the private telecast of that event to their homes later.

In case the return channel is available, the interactive application in STB 140, after sending the request to information server 160, triggered by user 200, receives an acknowledgement from information server 160 and keeps waiting for receiving an event on a specific TV channel; the event may indicate not only that the requested content items are coming but also the channel used for transferring the requested content items that can be e.g. the same TV channel or on a different TV channel of the same multiplex.

After receiving any event, the interactive application checks whether the contents are associated to its previous request; this can be done e.g. simply by comparing the ID of the contents with the ID provided with the acknowledgement; anyway, more complex and tamper-resistant techniques based on certificates can be used. When the event corresponding to the requested contents arrives, the application checks that the electronic appliance is operative and connected and starts the download and storage into the appliance.

In case the return channel becomes not available or has a limited bandwidth, information server 160 should send to broadcasting playout 110 the correspondence between the STB and/or User and the requested items. Broadcasting playout 110 can multiplex on a same stream the additional contents and the ID of the recipient (STB and/or User), in order to make the STB to recognize the content items that should be downloaded into appliance 180.

A second extension relates to the download time of the contents requested by the user. The download may start immediately after information server 160 receives the user's request, but a mechanism to delay the delivery of the contents to an appropriate timeframe can be set up in addition or in replacement to the immediate download. This would be particularly useful for example in case of a subscription model service or for more efficient bandwidth occupancy (e.g. downloads could be concentrated during the night). This can be implemented for example in the following way. The acknowledgement from information server 160 could include the information about the time frame when the contents are available for the download (starting time and duration). Then, the application set up the connection with information server 160 at the indicated time in the indicated time frame.

A third extension relates to the personalization of the CoD service, i.e. the offer of additional contents could be personalized to the specific users and/or STBs. Assuming that an STB can communicate with a smart card, either physically inserted in the STB or in some device connected to the home network (e.g. physically inserted in access gateway), the list of contents proposed to the user on the TV screen could depend on the user profile associate to that smart card. For example, the user will be able to download any item in the list only if he has applied for a premium service, or in the other case he will be able to choose and/or to receive only free contents.

Some variations require the possibility of the STB to write information on a smart card. In this case, for example, the reward for viewing a TV program could be the access to PPV services or games. In this case, a certificate is downloaded on the smartcard through the interactive application on the STB. In the case of games, if necessary, also the game could be downloaded on an appliance connected to the STB.

Finally, one interesting possibility is that the system according to the present invention can be connected with an e-commerce infrastructure; in fact, the download of contents may be subject to a payment to be carried out through an e-commerce infrastructure.

As it is apparent from the preceding description, the present invention can be implemented in many different ways and can find many different applications. Therefore, in the following, the present invention will be set out in general terms in line with the annexed claims.

Essentially the present invention relates to a method for storing contents associated to a TV program into an electronic appliance.

In general, this method comprises the steps of:
A) receiving a TV signal through a TV receiver, the TV signal carrying at least the TV program and data relating to contents associated to said TV program,
B) decoding the TV signal and identifying said contents data,
C) asking the user his interest in said contents,
D) getting a reply from the user specifying which of said contents he is interested in,
E) collecting said specified contents, and
F) storing said collected contents into an electronic appliance;

wherein said steps are carried out sequentially and automatically, i.e. without the intervention of the user with the exception of his reply at step D.

The TV receiver may be a TV STB, but can also be a TV set with an integrated STB or other kinds of electronic devices able to receive TV signals and to show video on a screen directly or indirectly connected to the receiver. It can be noted that depending on how the present invention is implemented step E and step F can be strictly connected and partially overlapping; in fact, the collecting step comprises all the activities that precedes the storage of the contents into the electronic appliance. If, for example, the contents is first temporary stored into the TV receiver or STB and then permanently stored into the electronic appliance, the temporary storage may be regarded as part of step E or as part of step F.

Typically, according to the present invention, the collected contents are stored into non-volatile storage means of the electronic appliance for future use by the user; such storage means can be e.g. semiconductor integrated circuit as it would be the case of an MP3 player or a PDA or a mobile cellular phone.

Typically, according to the present invention, the contents associated to the TV program are multimedia contents, i.e. a combination of different media for example audio and video.

Anyway, important application of the present invention may provide that the stored contents are not directly multimedia contents but are keys for decrypting multimedia contents or licenses for using multimedia contents or keys for accessing multimedia contents. In this case, typically, the user can freely download multimedia contents at any time and in any way but can use these downloaded multimedia contents only if he has downloaded the key or license during or as a consequence of the TV program. The electronic appliance where storage is to take place according to the present invention may be any device separate from the TV receiver and from the STB that is provided with a non volatile storage capability and is adapted to store in a non volatile manner the content specified by the user, i.e., to store the content for a time sufficient to allow the user to play it at a time of her/his choice.

The electronic appliance where storage is to take place according to the present invention may be connected directly or indirectly to the TV receiver. An example of a direct connection would be through an USB port or a Bluetooth link or some dedicated cable. An example of indirect connection would be through e.g. a home local area network. In this case, the storage of contents into the electronic appliance may takes place through the TV receiver.

One further possibility is that the electronic appliance is a smartcard (or chip card), for example a SIM card. This is a typical case when the contents correspond to keys; anyway, it is also applicable to Java games, sounds or images for mobile cellular phones.

The electronic appliance where storage is to take place according to the present invention may be connected directly or indirectly to the Internet. In this case, the transfer of contents into the electronic appliance may take place directly from an information server via the Internet and e.g. through the access gateway without the help of the TV receiver.

The electronic appliance where storage is to take place according to the present invention may be connected directly or indirectly to a fixed or mobile telephone network. In this case, the transfer of contents into the electronic appliance may take place directly from an information server through the telephone network without the help of the TV receiver.

One or more of the steps set out above may be carried out taking into account the identity of a user and/or of the TV receiver, the identity being stored in the TV receiver or in a smartcard associated to the TV receiver. This feature is useful for limiting or discriminating the possibility of storage e.g. according to service subscriptions or regional/national preferences.

One or more of the steps set out above may be carried out taking into account a user profile, the user profile being stored in the TV receiver or in a smartcard associated to the TV receiver. This feature is useful for personalizing the offer of contents to the various different users; as it is known more and more users expect personalized services; for example, if a user is interested only in classic music no red dot will appear on his screen when only pop music contents are associated to the TV program he is watching.

Typically, step C and said step D are carried out by the TV receiver through an interactive application stored or downloaded into the TV receiver.

Typically, step C provides that at least one image is displayed on a display associated to the TV receiver; this image could be a menu partially superimposed to the TV video sequence.

Typically, step D provides that the TV receiver receives input from the user; this input could derive from the keys of the remote control device of the TV receiver.

Typically, step E provides that the TV receiver sends at least one message to an information center through a wired data network or wireless data network or telephone network.

Many possibilities exist for the content of such message sent from the TV receiver to the information center; additionally, a number of consecutive messages may be provided.

If at step C only one single content item was offered to the user, at step E the message should indicate (explicitly or implicitly) the interest of the user to this single item; if at step C some content items were offered to the user, at step E the message should contain information identifying the contents specified by the user.

At step E, the message may indicate the identity of the TV receiver and/or of the user; this may be useful for billing the cost of the contents specified by the user or for checking the authorization of the user to store the contents specified.

As already mentioned, step E may provide that the TV receiver detects the operative status of the electronic appliance before sending one or more messages to the information center; additionally, step E may provide that the TV receiver alerts the user if it detects that the electronic appliance is not operative, i.e. not ready or able to store contents.

At step E, the message may indicate a telecommunication address, for example the IP address, of the electronic appliance. This is useful for allowing that the information center is able to communicate directly with the electronic appliance e.g. for carrying out the transfer of the contents. For example, the information center might transfer an image (to be used as background image) to a mobile cellular phone by making a direct phone call.

At step E, the message may indicate a service request for the provision of contents to the user in push mode. It is in fact possible that during a TV program it is offered to the user not simply one or more contents items but e.g. a subscription for the regular reception of content items. For example, a user may be interested in regularly updating his MP3 player with the song of a certain singer or in regularly updating his PDA with the stock rates of a certain company or in regularly receiving on his UMTS cellular phone the trailers of the new films etc.

Step E (collection) and step F (storage) may be carried out through two different communication channels; in fact, collection may require a narrow bandwidth while storage may require a wide bandwidth; additionally, collection is primarily carried out by the TV receiver while storage is primarily carried out by the electronic appliance.

As already mentioned, the contents specified by the user may be transmitted by the information center in step E and/or in step F to the TV receiver for temporary storage or directly to said electronic appliance.

A first possibility for such transmission of contents (used in the embodiment described herein in detail) is to use the return channel of a TV system which is a bidirectional communication link.

A second possibility for such transmission of contents is broadcast transmission through the same TV signals; as the bandwidth for such transmission of contents within a TV signal is limited, the transfer of contents may be rather slow.

As already mentioned, other possibilities exist. The storage of the contents specified by the user at step F may be carried after a certain period of time from the collection at step E, in particular it may be carried out immediately after.

The storage of the contents specified by the user at step F may be carried at a time specified by the user or at a time specified by the information center.

According to a further aspect the present invention relates also to a TV receiver having the features (hardware and/or software) adapted to carry out the method set out above, particularly only steps from A to E or all the steps from A to F.

The invention claimed is:

1. A method for storing contents associated with a television program into a portable electronic appliance, comprising:
    A) receiving a television signal through a television receiver, the television signal carrying at least a television program and data relating to contents associated with said television program;
    B) decoding the television signal;
    C) taking into account a user profile stored in said television receiver or in a smart card associated with said television receiver;
    D) identifying relevant contents data based on said user profile;
    E) asking a user, via the television receiver and without the user initiating said asking, for said user's interest in said contents and for an identification of the portable electronic appliance designated to receive said contents;
    F) getting a reply from the user, via the television receiver, specifying which of said contents are of interest and identifying the portable electronic appliance designated to receive said contents;
    G) collecting specified contents; and
    H) enabling storage of collected contents associated with the television program in the portable electronic appliance separate from the television receiver,
said method being carried out sequentially and automatically.

2. The method according to claim 1, wherein said collected contents are stored in non-volatile memory of said portable electronic appliance.

3. The method according to claim 1, wherein said contents associated with said television program are multimedia contents.

4. The method according to claim 1, wherein said contents associated with said television program are keys for decrypting multimedia contents or licenses for using multimedia contents or keys for receiving multimedia contents.

5. The method according to claim 1, wherein the identity of said user and/or of said television receiver is taken into account, said identity being stored in said television receiver or in a smartcard associated with said television receiver.

6. The method according to claim 1, wherein said asking a user and said getting a reply are carried out by said television receiver through an interactive application stored or downloaded into said television receiver.

7. The method according to claim 1, wherein said asking a user comprises displaying at least one image on a display associated with said television receiver.

8. The method according to claim 1, wherein, in said getting a reply, said television receiver receives input from the user.

9. The method according to claim 1, wherein, in said collecting specified contents, said television receiver sends at least one message to an information center through a wired or wireless data or telephone network.

10. The method according to claim 1, comprising carrying out said collecting specified contents and said enabling storage of storing collected contents through two different communication channels.

11. The method according to claim 1, wherein, in said collecting specified contents and/or said enabling storage of collected contents, said television receiver receives said specified contents from an information center for temporary storage or said portable electronic appliance receives said specified contents directly.

12. The method according to claim 1, comprising carrying out said enabling storage of collected contents at a time specified by said user.

13. The method according to claim 1, comprising carrying out said enabling storage of collected contents at a time specified by an information center.

14. A television receiver capable of being adapted to carry out the method according to claim 1, when said television receiver is connected to a portable electronic appliance having non-volatile memory.

15. The method according to claim 9, wherein, in said collecting specified contents, said television receiver sends information identifying said specified contents to said information center.

16. The method according to claim 9, wherein, in said collecting specified contents, said television receiver sends the identity of said television receiver and/or of said user to said information center.

17. The method according to claim 9, wherein, in said collecting specified contents, said television receiver detects the operative status of said portable electronic appliance before sending said at least one message to said information center.

18. The method according to claim 9, wherein, in said collecting specified contents, said television receiver sends a telecommunication address of said portable electronic appliance to said information center.

19. The method according to claim 9, wherein said at least one message comprises a service request for the provision of contents in push mode.

20. The method according to claim 17, wherein, in said collecting specified contents, said television receiver alerts the user upon detecting that said portable electronic appliance is not operative.

21. The method according to claim 11, wherein, in said collecting specified contents and/or said enabling storage of collected contents, said television receiver receives said specified contents from said information center through the return channel of a television system.

22. The method according to claim 11, wherein, in said collecting specified contents and/or said enabling storage of collected contents, said television receiver receives said specified contents from said information center in broadcast mode through television signals.

23. The method according to claim 12, comprising carrying out said enabling storage of collected contents after a certain period of time from said collecting specified contents.

* * * * *

UNITED STATES PATENT AND TRADEMARK OFFICE
CERTIFICATE OF CORRECTION

| | | |
|---|---|---|
| PATENT NO. | : 8,789,100 B2 | Page 1 of 1 |
| APPLICATION NO. | : 12/227827 | |
| DATED | : July 22, 2014 | |
| INVENTOR(S) | : Contin et al. | |

It is certified that error appears in the above-identified patent and that said Letters Patent is hereby corrected as shown below:

In the Claims

Claim 10, column 12, lines 4-5, "enabling storage of storing collected contents" should read -- enabling storage of collected contents --.

Signed and Sealed this
Fifth Day of May, 2015

Michelle K. Lee
*Director of the United States Patent and Trademark Office*